United States Patent
Vanderelli et al.

(10) Patent No.: US 9,467,009 B2
(45) Date of Patent: Oct. 11, 2016

(54) DIPOLAR TRANSVERSE FLUX ELECTRIC MACHINE

(71) Applicants: Timm A. Vanderelli, Ligonier, PA (US); Rodney A. Carter, Buchanan, TN (US)

(72) Inventors: Timm A. Vanderelli, Ligonier, PA (US); Rodney A. Carter, Buchanan, TN (US)

(73) Assignee: Kress Motors, LLC, Ligonier, PA (US)

(*) Notice: Subject to any disclaimer, the term of this patent is extended or adjusted under 35 U.S.C. 154(b) by 677 days.

(21) Appl. No.: 13/837,141

(22) Filed: Mar. 15, 2013

(65) Prior Publication Data

US 2014/0265652 A1    Sep. 18, 2014

Related U.S. Application Data

(63) Continuation-in-part of application No. 13/397,121, filed on Feb. 15, 2012, which is a continuation-in-part of application No. 12/975,652, filed on Dec. 22, 2010, now Pat. No. 8,138,696.

(60) Provisional application No. 61/228,938, filed on Dec. 22, 2009.

(51) Int. Cl.
| | |
|---|---|
| *H02K 1/08* | (2006.01) |
| *H02K 1/22* | (2006.01) |
| *H02K 21/24* | (2006.01) |
| *H02K 41/03* | (2006.01) |
| *H02K 1/18* | (2006.01) |
| *H02K 15/02* | (2006.01) |

(52) U.S. Cl.
CPC ............ *H02K 1/08* (2013.01); *H02K 1/182* (2013.01); *H02K 15/022* (2013.01); *H02K 21/24* (2013.01); *H02K 41/031* (2013.01); *H02K 2201/12* (2013.01)

(58) Field of Classification Search
CPC .................................. H02K 1/08; H02K 1/22
USPC .................................................. 310/46, 68 B
See application file for complete search history.

(56) References Cited

U.S. PATENT DOCUMENTS

| | | |
|---|---|---|
| 4,584,506 A | 4/1986 | Kaszmann |
| 4,761,590 A | 8/1988 | Kaszman |
| 5,227,702 A | 7/1993 | Nahirney |

(Continued)

FOREIGN PATENT DOCUMENTS

WO    0152390 A1    7/2001

OTHER PUBLICATIONS

Office Action for U.S. Appl. No. 12/975,652 dated Jul. 11, 2011.

(Continued)

*Primary Examiner* — Kawing Chan
(74) *Attorney, Agent, or Firm* — David G. Oberdick

(57) ABSTRACT

The present invention relates to an improved electric machine which, when operating in motor mode, produces rotational torque without using alternating magnetic polarity, but rather magnetic axial flux that utilizes coils arranged in a dipolar manner around an axial plane. In a preferred embodiment of the invention, the use of energy is significantly enhanced therein by injecting the energy harvested from the collapsing fields of electromagnetic drive components, and then directing said energy from said primary-drive coils of the machine into an isolated circuit which is thereafter introduced as a transient secondary process to power secondary-drive coils of the machine in order to increase the overall efficiency of the machine.

11 Claims, 10 Drawing Sheets

(56) References Cited

U.S. PATENT DOCUMENTS

| | | | |
|---|---|---|---|
| 5,258,697 | A | 11/1993 | Ford et al. |
| 5,514,923 | A | 5/1996 | Gossler et al. |
| 5,696,419 | A | 12/1997 | Rakestraw et al. |
| 5,925,958 | A | 7/1999 | Pirc |
| 6,169,343 | B1 | 1/2001 | Rich |
| 6,392,370 | B1 | 5/2002 | Bedini |
| 6,462,491 | B1 | 10/2002 | Iijima et al. |
| 7,109,671 | B2 | 9/2006 | Bedini |
| 7,230,358 | B2 | 6/2007 | Smith |
| 7,400,069 | B2 | 7/2008 | Kundel |
| 7,564,208 | B2 | 7/2009 | Bailey et al. |
| 7,898,229 | B2 | 3/2011 | Babcock et al. |
| 2001/0048226 | A1* | 12/2001 | Nada ............... F02N 11/0859 290/40 C |
| 2002/0097013 | A1 | 7/2002 | Bedini |
| 2004/0155525 | A1* | 8/2004 | Ohtaki ............... B60R 25/04 307/10.5 |
| 2006/0038456 | A1 | 2/2006 | Bojiuc |
| 2009/0021089 | A1* | 1/2009 | Nashiki ............... H02K 21/24 310/46 |
| 2009/0045690 | A1 | 2/2009 | Kerlin |
| 2009/0085511 | A1 | 4/2009 | Meinke et al. |
| 2009/0236930 | A1* | 9/2009 | Nashiki ............... H02K 1/145 310/257 |
| 2010/0080592 | A1* | 4/2010 | Hamaya ............. G03G 15/0266 399/50 |
| 2010/0196185 | A1 | 8/2010 | Higuchi et al. |
| 2010/0237729 | A1 | 9/2010 | Lawson |
| 2011/0025067 | A1 | 2/2011 | Cipriani |
| 2011/0089872 | A1 | 4/2011 | Vanderelli et al. |
| 2011/0109185 | A1 | 5/2011 | Sullivan et al. |
| 2013/0015741 | A1 | 1/2013 | Kim et al. |

OTHER PUBLICATIONS

Office Action for U.S. Appl. No. 12/975,652 dated Oct. 28, 2011.
International Search Report and Written Opinion for International Application No. PCT/US2013/032274 dated Feb. 27, 2014.

* cited by examiner

DIPOLAR TRANSVERSE FLUX ELECTRIC MACHINE

CROSS-REFERENCE TO RELATED APPLICATIONS

This is a continuation-in-part application of U.S. patent application Ser. No. 13/397,121 filed on Feb. 15, 2012.

BACKGROUND

Numerous attempts have been made to increase the efficiency of electric machines. Many of these attempts are set forth in patents and patent applications such as:

U.S. Pat. No. 6,392,370, Bedini, Device and Method of a Back EMF Permanent Magnet Electromagnetic Motor;

U.S. Pat. No. 7,230,358, Smith, DC Resonance Motor;

U.S. Pat. No. 7,459,822, Johnson, Rotating Electric Machine Having Switched or Variable Reluctance with Flux Transverse to the Axis of Rotation; and US Patent Application 2009/0045690, Kerlin, DC Homopolar Motor/Generator.

SUMMARY OF THE INVENTION

The present invention is an efficient dipolar axial flux electric machine. The flux is axial to the rotational shaft and transverse to the rotational plane of the machine. It can be embodied in various form factors for use in a variety of applications and requires no magnets. In one of its preferred embodiments the machine comprises at least one rotor that has at least "N" rotor members spaced on a surface of its rotor. Each of the N rotor members includes a ferrous based facing and includes air gaps there between. The machine also includes at least one stator juxtaposed and spaced apart from rotor. The stator preferably includes N±X stator members where each of the stator members is spaced apart and in co-axial relationship with the axis of the rotor members. The number of rotor and stator members is a design consideration linked to the number of electrical phases upon which the machine is designed to operate. Each of the stator members is preferably "U"-shaped with a coil-winding around each stator core member. The number of core pairings and their control timing determines the number of phases of the machine.

Because of the unique configuration of the stator and rotors, no back-iron or yoke is necessary to complete the magnetic circuits between the stators and the rotor. This configuration provides a shorter flux path than conventional motors, and provides a higher flux density. Further, the flux path through the motor elements is designed to reduce axial thrust, vibration and noise. In the rotational and linear embodiments of the invention, there is a co-axial relationship between the stator members and the rotor members in the case of a rotating machine, and a co-planar relationship between the stator members and the rotor members in a linear machine The present invention has flexible geometry: it is possible to operate only single-pair, double-pair, or n-pair stators. When the desired output requirement is lower than normal, it is possible to operate only the required number of stators, thus reducing energy input required. This makes the invention's geometry novel and allows for open rotors and the use of rotors as impellers or drive elements.

The present invention continues to operate even when some stators and phases are damaged. Typical machines stop operating when one of their stators fails. In such cases, the machine may consume more power to run at the same speed and with the same load, or it may operate at a lower speed. The machine does not, however, breakdown abruptly. For example, for increased reliability, our three phase machine will continuously run with the loss of one or two phases of drive current. Stator drive currents are continuously monitored and automatically adjusted by feedback control system to compensate for lost drive phases.

In a preferred application, each of the stator members includes a coil positioned parallel to the axis of rotation of the rotor. The machine also includes a detecting means for detecting the position of the rotor in relationship to the stator members. A control means is provided for receiving at least a first input from the rotor's rotation detecting means for controlling input into selected stator members in response to the detected signals produced by the detecting means. The control means also includes means for providing a current to at least one stator coil in response to a signal from the detecting means.

In an embodiment of the invention, the rotor is positioned concentrically and externally around the stator. In another preferred embodiment, the rotor is positioned internally of the stator coils and, in another embodiment, the stator and/or rotor is linear.

The dipolar axial flux machine provides primary coils that produce commutation currents from counter-electromotive force (herein referred to as "CEMF"), which when directed through a circuit, such as an LC circuit, enhance the efficiency of the machine. These currents are switched on and off through a secondary set of stator coils without the need for these currents to be returned to the control system's intermediate DC bus. In another embodiment, an induced current passes within close proximity to the primary coils and directed to a power source and introduced into a set of secondary coils. The machine creates rotational torque as a direct result of rotor members being attracted to both primary and secondary stator members before commutation and repelled away from the stator coils as a consequence of the commutation event.

In one embodiment of the present invention, a housing is used to support a rotatable shaft and at least one rotor disk mounted to the shaft for rotation therewith. In a preferred embodiment, the rotor is made from a pressed metal alloy such as Somaloy® 700 with N rotor members aligned parallel to the shaft. A cylindrical stator is concentrically positioned around the rotor to support N±X coils, where N and X are both positive integers. In embodiments of the invention, X is the number of phases times the number of driven stator cores per phase. Generally, X is greater than N if the stator members are external of the rotor, and generally X is less than N when the stator members are internal of rotor. The stator coils are preferably fabricated from the same Somaloy® alloy as the rotor and are spaced apart from each other. In one embodiment, each of the stator members is removably mounted into a housing to facilitate repairs of the machine in a modular manner. At least one timing wheel is positioned on the shaft adjacent to the support member. Additionally, at least one Hall-effect device or a similarly effective device, such as an optical encoder or resolver, is positioned so as to be influenced by a rotating shaft.

A control circuit is provided for controlling the current to respective coils when activated by the Hall-Effect device or similar angular-position detection device. A circuit is also provided for receiving current from at least one of the coils during rotation of the rotor when at least one coil is not directing current to that coil. The current received is directed to the control circuit for application to at least one of said other coils. By directing the inductive energy stored in the recently un-commutated coils to the recently commutated coils, efficiency is enhanced which results in less waste heat from the machines of the present invention.

The present invention achieves dipolar operation by juxta-positioning N rotor members across from X electromagnetic stator members with a small gap between stator and rotor members. Pulsed electromagnetic fields are arranged to induce the north and south fields simultaneously upon an axially aligned tooth of the rotor which results in a force that imparts a pure rotational torque on the rotor while significantly reducing axial thrust forces. In a preferred embodiment of the invention, for example, the stator is positioned around the rotor that has eight rotor members made of Somaloy® 700, or other ferrous materials such as 53C (Fe 3% Si or other soft magnetic materials), and twelve stator members that are configured to provide a three phase magnetic field that interacts with the rotor members and the rotational inertia of the rotor to produce an approximately constant torque output during operation.

Accordingly, with the same or less input power, the present invention utilizes dipolar axial flux together with the current resulting from CEMF to provide greater torque and efficiency. In a preferred embodiment of the invention, a coil 'core' is made from laminated or solid electrical steel to increase the flux density of the magnetic field. Other 'core' types such as grain oriented steels and Ferro-Composites are contemplated for use to further increase overall efficiency.

Various advantages of the machines of the present invention include:

- A secondary circuit that provides a low loss path for current spikes (which result from the collapse of energy-storing magnetic fields) to follow rather than producing waste heat. For example the input current that flows from a 12 Volt Direct Current (DC) input results in a short-duration induced CEMF voltage of about 200 Volts. This voltage is reduced to 12 Volts under load while being directed back into the machine.
- Removable stator and rotor members ("poles").
- A tertiary circuit; whereby, CEMF from said secondary circuit is coupled back to the input source as recaptured energy, further reducing heat.
- The machine housings and end plates of the present invention can be made of non-metallic component parts which can reduce weight and electrical shock hazard. In one preferred embodiment of the invention, ultra-high molecular weight (UHMW) plastics are used for such housings, end plates and rotor support parts.
- Lower operating temperatures which extend bearing and coil life.
- Survivability conditions in poly-phase operations; by varying the timing of the stator drive pulses or increasing the stator drive pulse width to the operating phases in the event of failure of the active phase drive device, or a shorted/open stator coil, torque can be delivered while the shaft is loaded for increased reliability. The axial design of the machine also allows a shorted stator coil to be automatically decoupled from magnetically interacting with the magnetic field of the rotor; thereby, eliminating the parasitic drag caused by a shorted stator coil.

DETAILED DESCRIPTION

Figure 1:
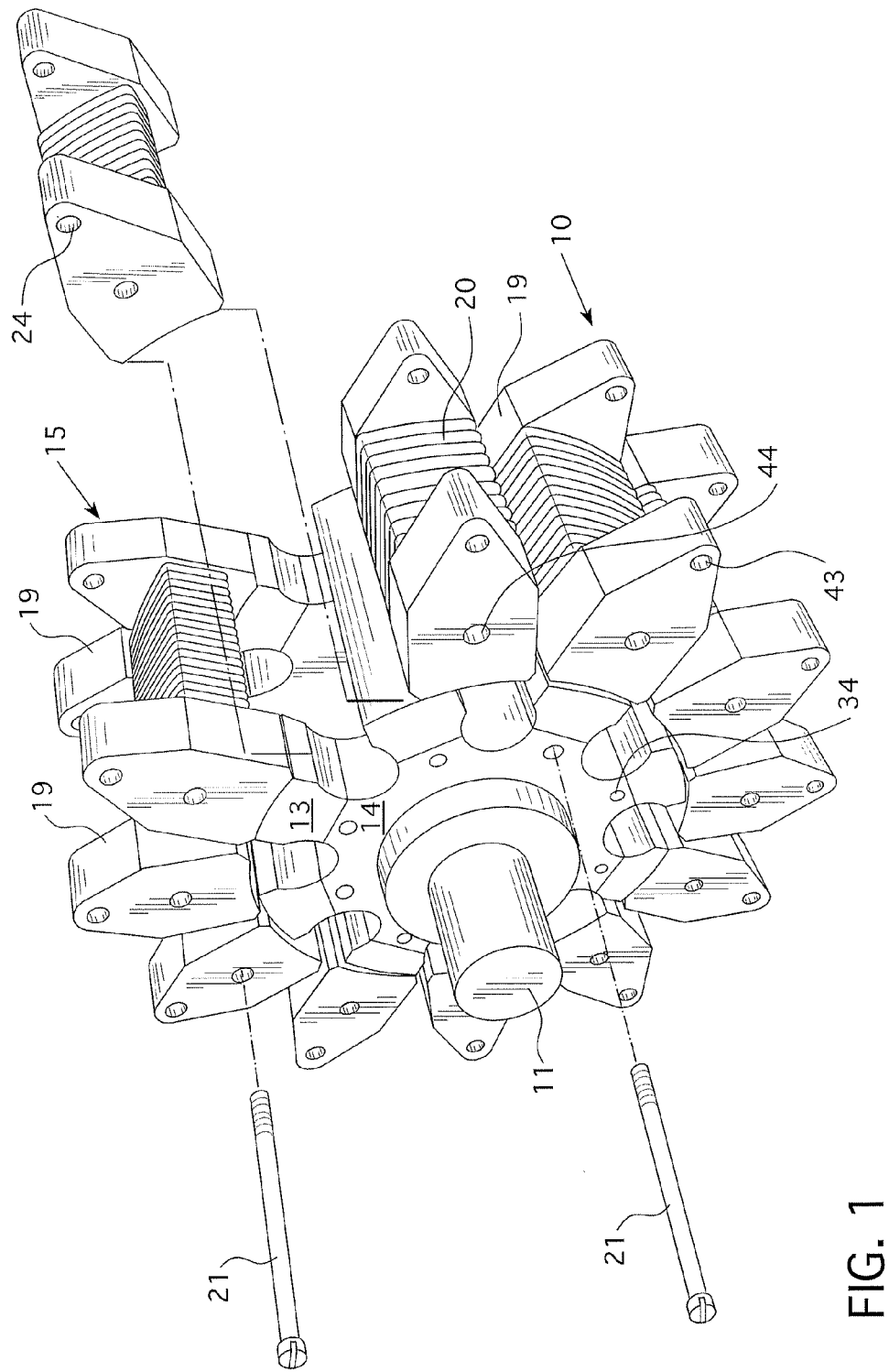
FIG. 1 is a perspective view of the coil magnet interface of the stators and rotor of a basic dipolar axial flux machine of the present invention.
Figure 2:
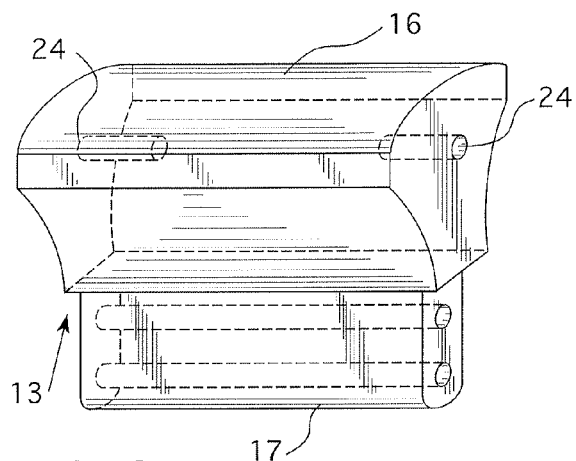
FIGS. 2 and 3 are perspective views of a removable rotor element of basic dipolar axial flux machine depicted in FIG. 1.
Figure 3:
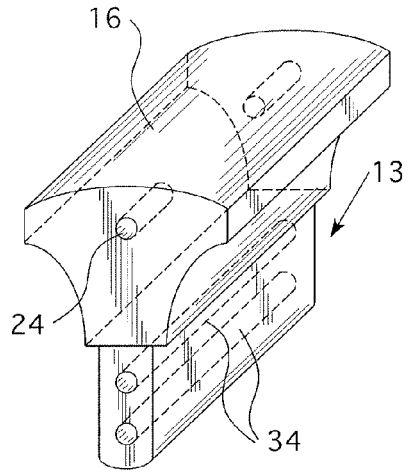
Figure 5:
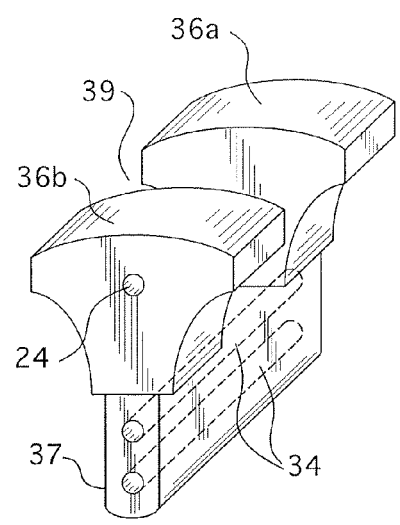

Referring to FIGS. 1, 2 and 5, one preferred embodiment of the dipolar axial flux machine 10 of the present invention is schematically shown. Machine 10 is shown mounted on drive shaft 11 and includes a rotor carrier 14 and stator 15. The rotor assemble includes a plurality of removable rotor members 13 and a plurality of rotor carriers 14 which accept the removable members 13. As shown in FIGS. 2 and 3, the rotor members 13 include a core surface member 16 and a support flange 17 therefore which accepts into respective carrier member 14. Fasteners 21 extend into openings 34 of the support flanges 17 of the rotor carrier members 14. A pair of openings 24 is provided to permit a removal tool, shown in FIG. 7, to grip rotor member 13 for removal thereof after removal of fasteners 21 from openings 34.

Figure 4:
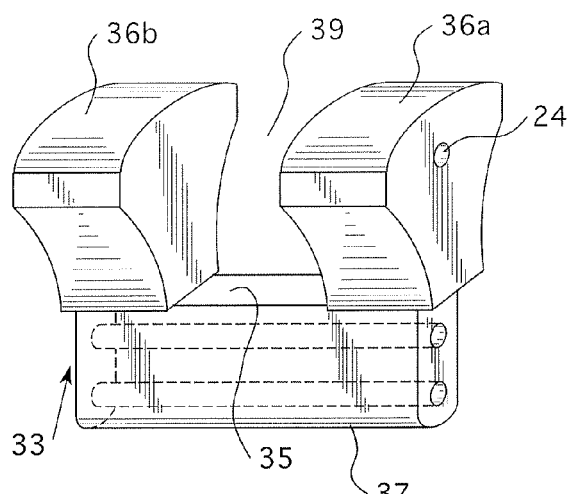
FIGS. 4 and 5 are perspective views of a removable rotor element of basic dipolar axial flux machine for use with a belt drive means.

As shown in FIGS. 4 and 5, a rotor member 33 is shown for use in driving a belt. Rotor member 33 includes a pair of spaced apart surface means 36a and 36b as part of support flange 37 which descends into carrier member 14 shown in FIG. 1. Also shown are openings 34 for fasteners 21, as described above. Opening 39 defined by spaced apart surface means 36a and 36b provides a frictional drive surface 35 for a belt drive means (not shown) driven by rotor carrier member 14. A pair of openings 24 are provided to permit a removal tool, shown in FIG. 7, to grip rotor members 36a and 36b.

Figure 7:
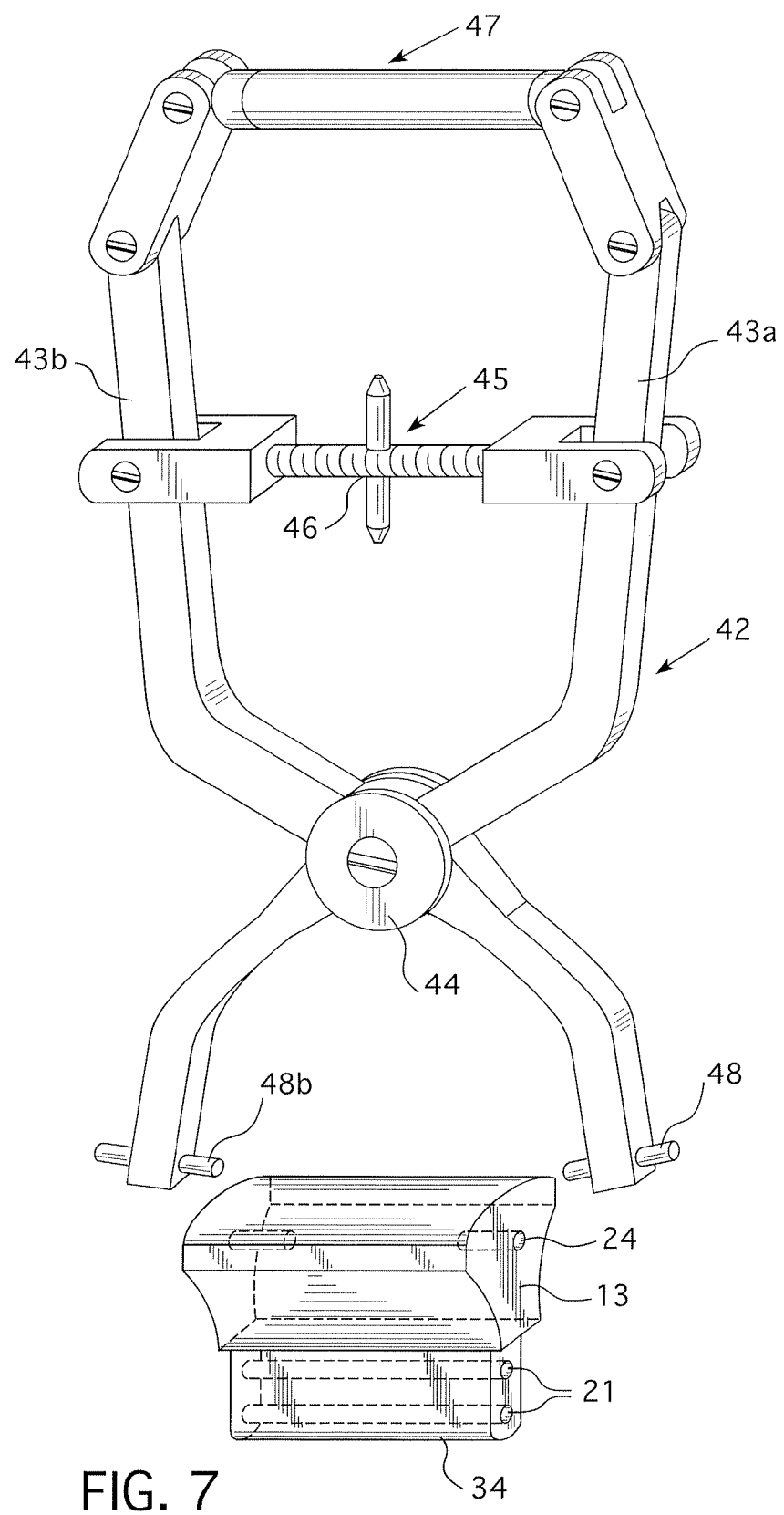
FIG. 7 is a tool for removing and inserting stator or rotor members of the present invention.

Referring to FIGS. 1 and 2, stator 15 is preferably mounted to a housing or support member (not shown). The stator includes a number of stator members 19. In a preferred embodiment, each stator member is a substantially elongated "U" shaped member with its base being about the length of rotor surface member 16. Stator member 19 is mounted so that its legs tend towards rotor carrier member 14. A stator coil 20 is positioned around the elongated portion of stator member 19. In a preferred embodiment, stator coils comprise a number of turns, for example 38 turns in the present embodiment; of 16 AWG enamel-coated copper wire. As shown in FIG. 1, stator 15 includes openings 43 in member 19. These openings accept a fastener 21 to attach or remove stator member 19 to or from stator 15's housing (housing not shown). The housing or support member can be made of plastic or other light-weight nonmetallic material. To facilitate the removal of a member, a removal tool 42 is shown in FIG. 7.

The relationship between the number of stator members and the number of rotor members in the present invention is dependent upon a number of factors. The general relationship is that the number of stator members is equal to N±X (N and X are positive integers) where N is equal to the number of rotor members. The factors that are determinative of X include whether the machine is co-axial or co-linear and whether the stator members are in a co-axial relationship and are either internal or external of the rotor members. If the stator members are co-axial and external to the rotor members, X is generally greater than N. If the stator members are internal to the rotor, then X is generally less than N. In a linear machine, X is generally less than N; however, this can vary depending on other functions the rotor may perform. Generally, therefore, X is the number of phases times the number of driven stator cores per phase.

In one embodiment of the invention, the core rotor members 13 and stator core members 19 are fabricated from sheets of electrical steel M-22, for example, having a C-5 enamel coating thereon. Alternatively, these cores may be pressed or cast from Somaloy® 700 or like alloy.

Figure 6:
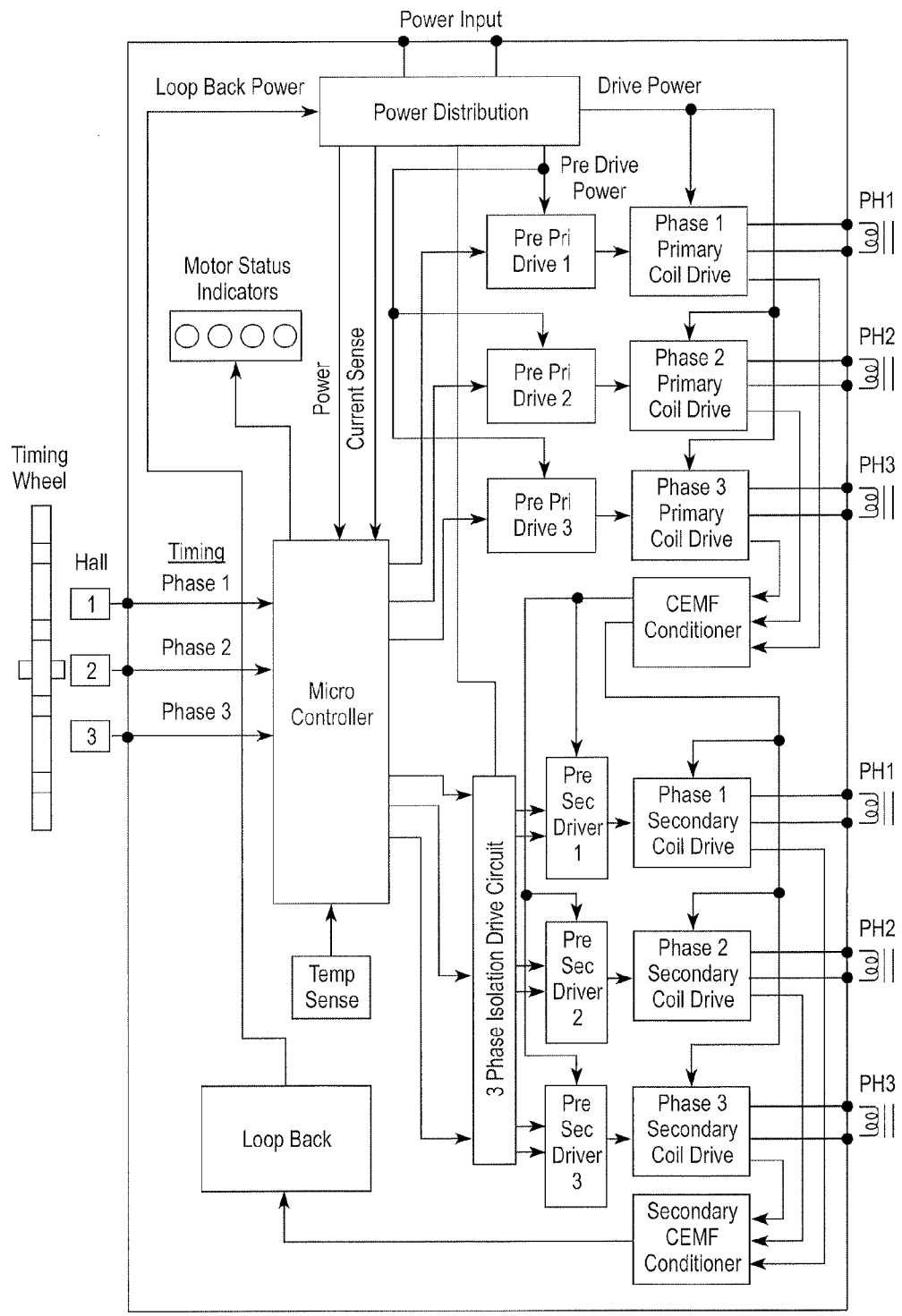
FIGS. 6 and 6A are block diagrams of control circuits for the machine shown in FIG. 1.

FIG. 6 is a schematic diagram showing one means for controlling the machine and utilizing the counter-electromotive force ("CEMF") to increase the efficiencies. It is estimated that up to about 20% input power is provided by CEMF, but diminishes in an inverse-logarithmic manner as said electrical machine's horsepower increases. During periods of time when Hall-Effect devices (or other angular position detecting device) are not being triggered, the electromagnetic field around the associated primary coils collapse and gives rise to an electrical current that is directed by rectifiers, then directed into a secondary transient stage, and subsequently used to power associated secondary coils. The resultant subsequent CEMF from the secondary coils is reintroduced back to the DC buss in this configuration.

Figure 6A:
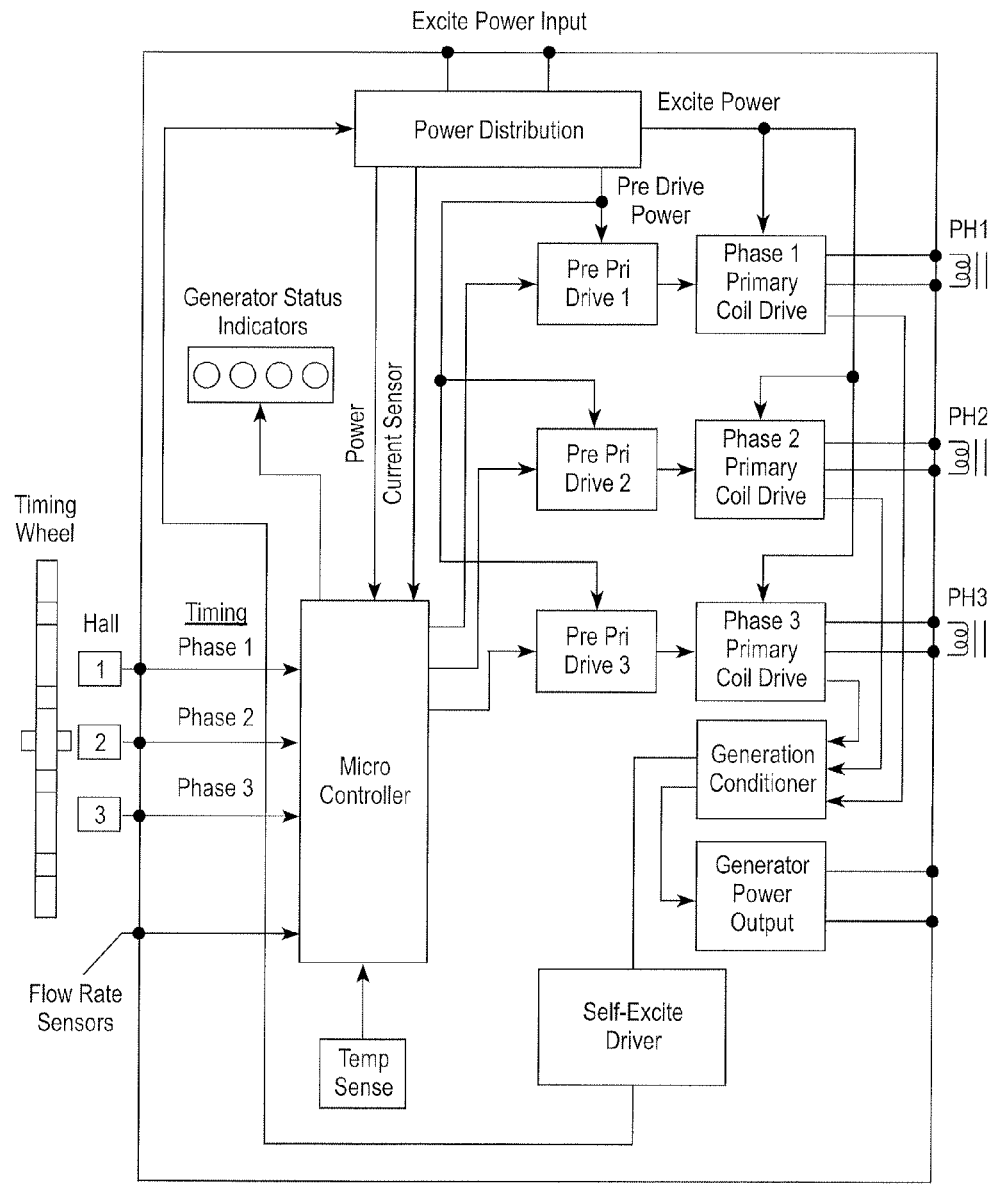

FIG. 6A shows another circuit block diagram which, when used in place of the circuit shown in FIG. 6, will configure the machine to function as a generator.

Generally, the circuits used in the DC machines provide pathways for electrical currents flowing through said primary stator coils to create electromagnetic dipole fields, which attract and induce magnetic currents into adjacent ferrous rotor core members and or alternatively in combination with coils. The rotor cores are a combined medium which are both conductive and permeable, retaining their magnetization for a period of time dependent on each type of ferrous material's coercivity. Optionally, induced currents into rotor coils are rectified and directed by said rotor-coil diodes to supply currents to charge rotor-coil capacitors. Once said rotor-coil capacitors reach full charge, the currents that they impart become available for supplying said rotor coils by way of switching-control devices, such as reed switches or electronically driven hall devices. Primary stator electromagnetic dipoles are aligned to have the same polarities as rotor coils. When the rotor coils are activated by the switching device, the discharge of said rotor capacitors through said rotor coils induce currents into primary stator coils cores, thereby repelling rotor cores away from electromagnetic dipole fields generated by the stator coils' core legs thus providing additional rotational torque to the rotor and drive shaft. The resulting counter-electromotive currents from the primary stator electromagnetic coils are directed as input to secondary stator control and logic circuits then outputted to secondary stator circuit, driving currents through third and forth secondary electromagnetic stator coils, creating electromagnetic dipole fields. Second-stage currents result from the collapsing secondary electromagnetic fields. Said second-stage currents are directed by way of second-stage and third-stage CEMF directing elements, such as diodes, into second-stage and third-stage CEMF switch elements, such as an IGBT switch into and out of second-stage CEMF isolation elements, such as isolation transformers or gated switching circuits. In one embodiment this results in high frequency pulses from the second-stage and third-stage CEMF. Said pulses are then directed by second-stage and third-stage diodes, filtered by second-stage and third stage capacitors, then returned to the source by way of steering diodes.

The secondary stator electromagnetic dipole fields attract and induce magnetic currents, i.e., flux, into adjacent ferrous rotor cores. These rotor cores constitute a combined medium, which is both conductive and permeable as a single compound as well as multiple regions, which optimize conductivity and permeability, retaining their magnetization for a period of time dependent on each type of ferrous material's coercivity and respond by repelling from said stator electromagnetic dipoles. When drive shaft rotation reaches a rate pre-determined by the controller, stable pulses are inputted to primary stator coil drive, such as a drive IGBT and secondary stator coil drive, such as a drive IGBT for maintaining drive shaft torque while drawing minimal current from the source, and continues to do so until input power is removed or drive shaft is loaded beyond available torque.

It is projected that as the intrinsic efficiency of the machine approaches 90% there is a diminished benefit from the CEMF directing elements.

In the foregoing embodiment, secondary stator coils consist of 45 turns of 16 AWG enamel coated copper wire around the ferrous core. Currents from primary CEMF are supplied into said secondary stator coils from three phase isolation secondary drive as shown in FIG. 6.

Shown below in Table 1 are the Input/Output Characteristics taken from an actual physical prototype of the current invention. The prototype is similar in construction to that shown in FIG. 1.

TABLE 1

| Input/Output, Torque and Efficiency Table | | | | | | | |
|---|---|---|---|---|---|---|---|
| Configuration | Shaft Torque (in-lb) | Shaft Speed (RPM) | Output Horsepower (hp) | Input Current (ADC) | Input Voltage (VDC) | Input Power Watts (W) | Efficiency |
| 3 phase 12 stator | 15 | 1100 | 0.209 | 17 | 25 | 425.00 | 37% |
| 3 phase 12 stator | 11 | 1600 | 0.223 | 15 | 25 | 375.00 | 44% |

TABLE 1-continued

Input/Output, Torque and Efficiency Table

| Configuration | Shaft Torque (in-lb) | Shaft Speed (RPM) | Output Horsepower (hp) | Input Current (ADC) | Input Voltage (VDC) | Input Power Watts (W) | Efficiency |
|---|---|---|---|---|---|---|---|
| 3 phase 12 stator | 8 | 1730 | 0.176 | 9 | 25 | 225.00 | 58% |
| 3 phase 12 stator | 6 | 1925 | 0.147 | 7 | 25 | 175.00 | 62% |
| 3 phase 12 stator | 4 | 2230 | 0.113 | 6 | 25 | 150.00 | 56% |

Other ferrous core materials are contemplated for use, and are not limited to steel. Materials such as liquid metals or pressed metal may be substituted for steel, depending on each machine's specific requirements and fall within the scope of our invention.

In one preferred embodiment, a three-phase machine achieved 2,750 RPM without shaft loading. When power to one of the stator coils was disconnected and the stator core physically removed from the housing, the shaft speed slowed to 2,000 RPM. The machine continued to operate on the remaining two phases. Further, when a second phase was disconnected, the shaft speed dropped to 1,750 RPM and the machine continued to operate on the remaining phase. In the case of a loaded shaft, it was found that by increasing the drive pulse width to the operating stator phases, in the event of a stator or driver failure, output torque can be maintained with the remaining active stator phases.

Referring to FIG. 7, a tool for removing the removable stator and rotor members is shown. Tool 42 includes a pair of crossed arms 43a and 43b pivotally connected by pin assembly 44. An adjustment member 45 is pivotally connected between respective upper arms 43a and 43b and includes a turn screw 46 which causes adjustment member 45 to separate or draw together arms 43a and 43b. An upper member 47 is pivotally connected to the upper terminus of arms 43a and 43b to cause the lower portion of arms 43a and 43b having pins 48a and 48b to move in and out the removal/insertion opening 24 of a rotor member or stator member of the present invention.

Figure 8:
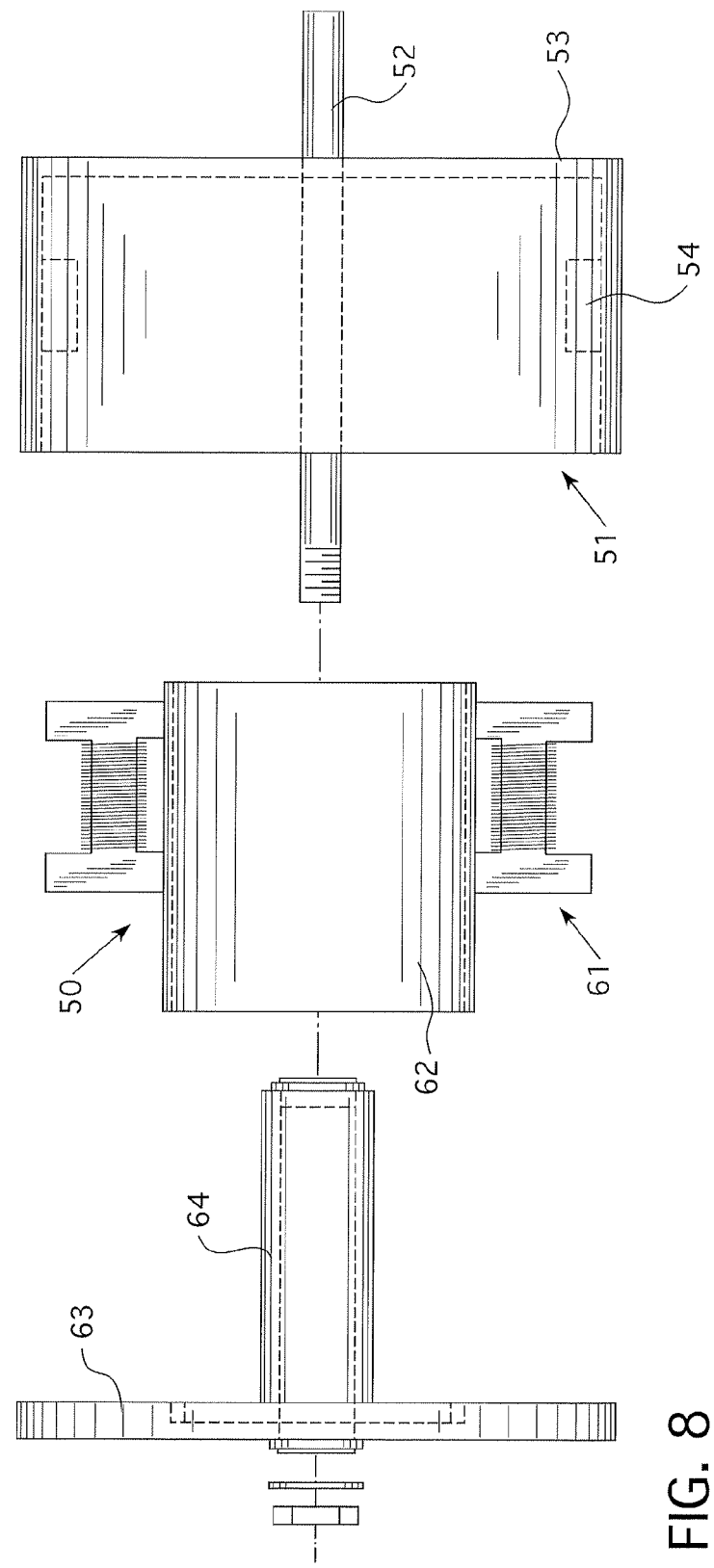
FIG. 8 is an exploded view of the external rotor configuration.
Figure 9:
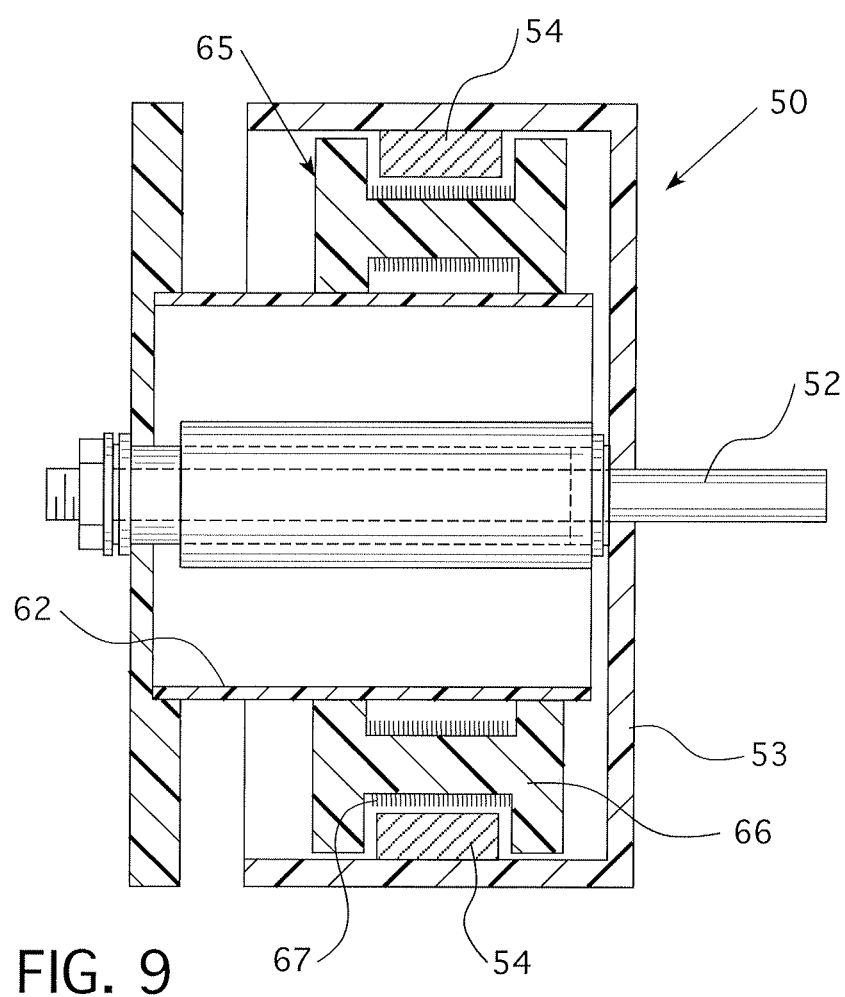
FIG. 9 is a sectional elevation of the machine shown in FIG. 8.

Referring to FIGS. 8 and 9, a dipolar axial machine 50 is shown where the rotor 51 is external of the stator 61. Rotor 51 is mounted to shaft 52 and comprises a cylindrical housing 53 which can be made of nonmetallic materials such as, for example, ultra-high molecular weight (UHMW) materials or fiberglass. Mounted on the interior wall of housing 53 are a plurality of rotor core members 54 which can be cast or pressed from Somaloy® 700 or electrical steel laminates as discussed above.

Stator 61 fixed into cylindrical support member 62 which is preferably mounted to support plate 63. Support plate 63 also includes a cylindrical support and bearing assembly 64 through which rotor shaft 52 is mounted as shown in FIG. 8. Referring to FIG. 9 mounted on the external surface of support member 62 is a plurality of stator coil members 65. Coil members 65 are wrapped with an enameled copper wire around an "H" shaped core 66 with coil 67 parallel to the axis of shaft 52. Core 66 is made from Somaloy® 700 or may comprise laminated sheets of electric steel as set forth above. The stator coil members 65 are co-axially aligned with rotor core members 54.

Axial flux machine 50 is useful in a number of applications including electric fans where the blades of the fan be molded into the exterior housing 53 of the fan. Housing 50 may also be molded in to the shape of a pulley or belt/chain sprocket to provide a significantly lighter and less expensive motive application than a typical machine and pulley combination.

Figure 10:
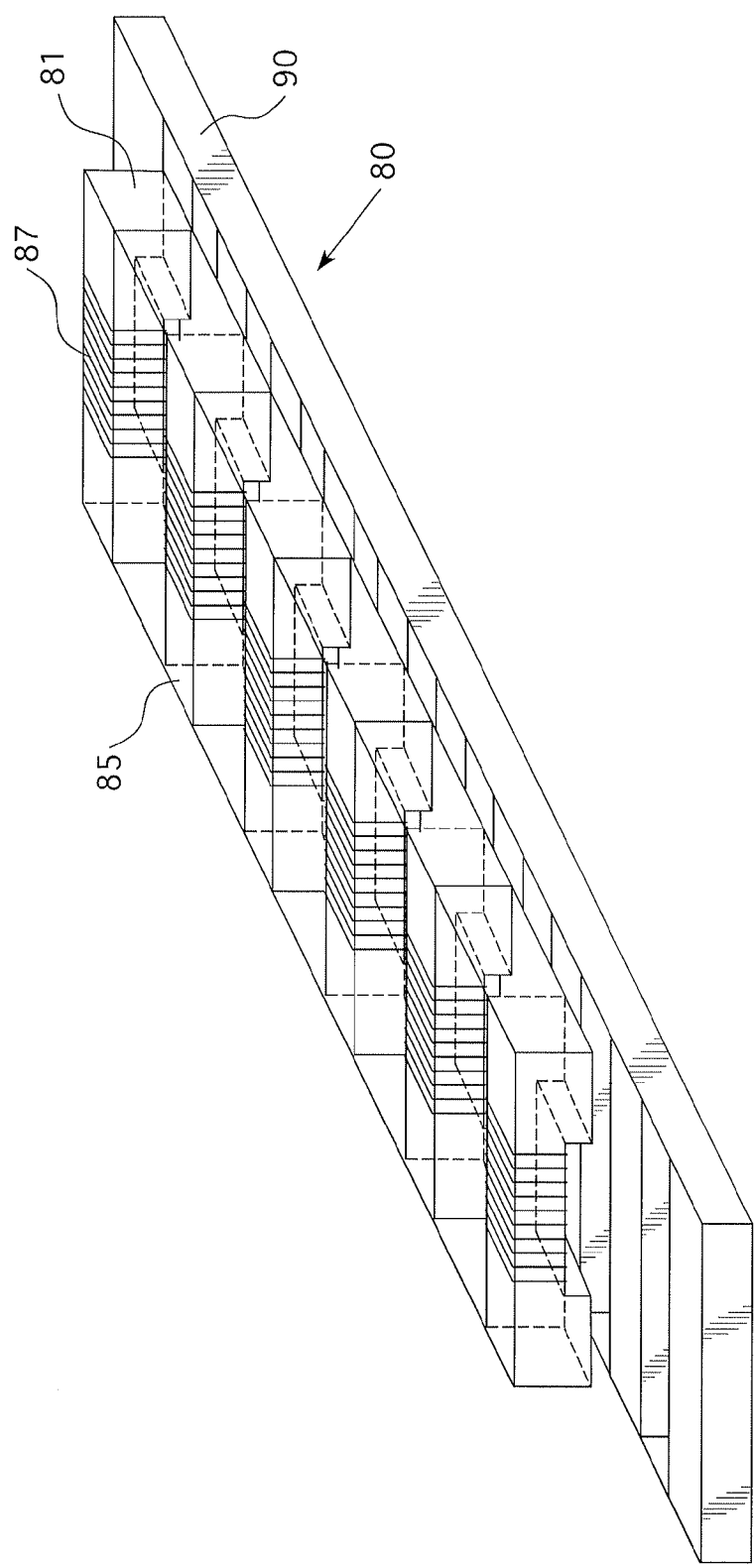
FIG. 10 is an isometric view of the interface between a linear stator and a linear rotor of the present invention.
Figure 11:
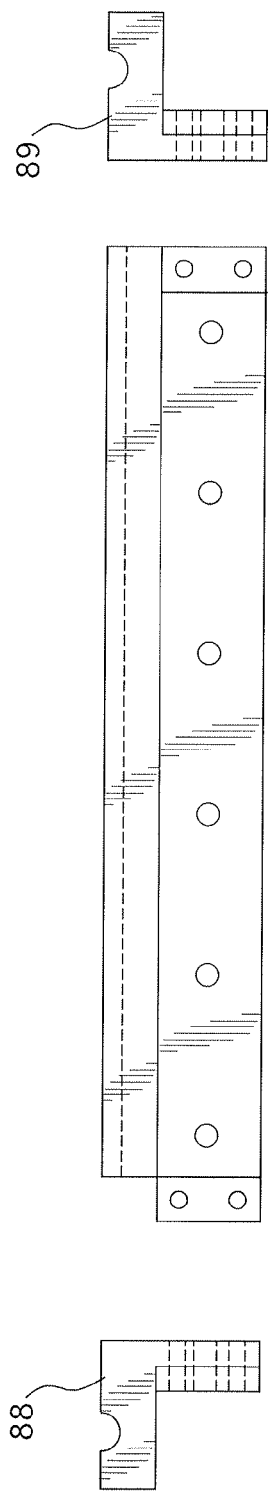
FIG. 11 is a view of support members for a linear stator of the present invention.
Figure 12:
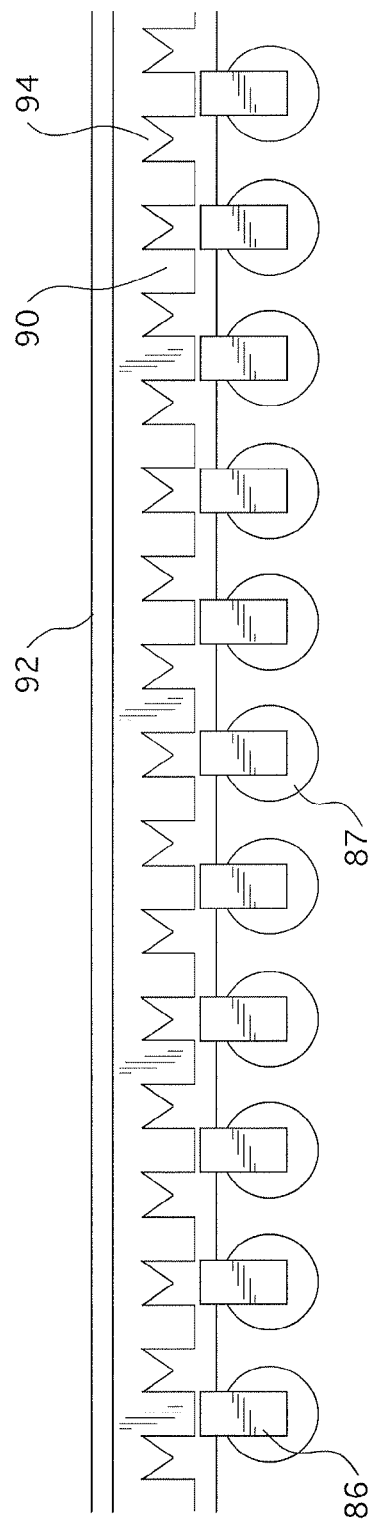
FIG. 12 is a side-view drawing of the relationships between the linear stators, rotors and carriage or belt of the present invention.

In another embodiment of the invention shown in FIGS. 10 through 12, a linear axial flux machine is shown. This embodiment literally "un-wraps" the circular embodiment shown in FIG. 1 into a linear machine. In this embodiment the machine 80 includes a linear stator 81 having a plurality of stator members 85. The stator member include a substantially "U" shaped core, "L" shaped core, "I" shaped core, or "C" shaped core 86 as described in the foregoing embodiments, including coils 87 mounted on support member 88 and 89. Linear rotor 90 includes a plurality of rotor members which are equally spaced apart and fixed together by a carriage or belt 92. Carriage includes magnetic field shaping and focusing materials, such as magnetic-steel laminations, or Somaloy® 700. The carriage may also include non-magnetic isolation materials, such as aluminum between the magnetic elements to reduce unwanted parasitic magnetic flux paths.

Figure 13:
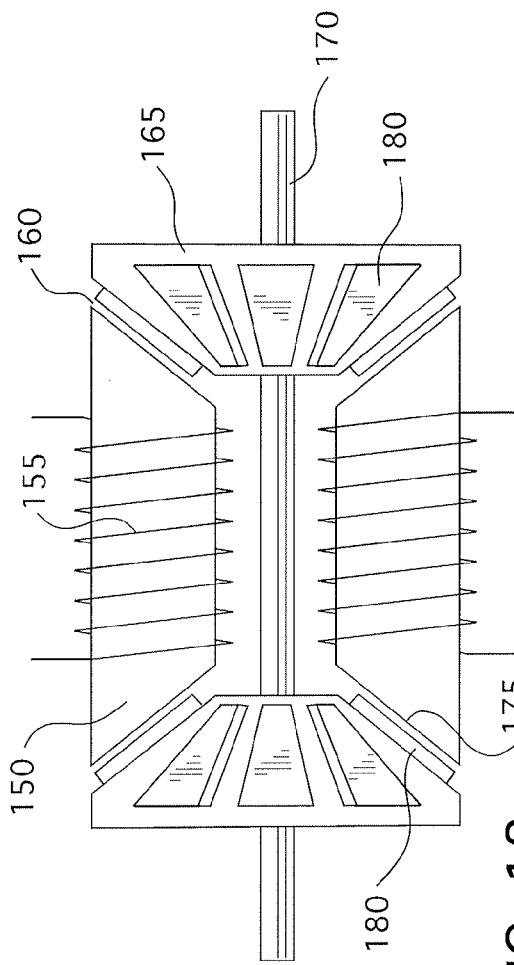
FIG. 13 is a perspective view of a bifurcated rotor assembly separated by stators with a trapezoidal edge to maximize the airgap length.

FIG. 13 shows another preferred embodiment utilizing windings 155, stator cores 150, and rotor poles 165 which are shaped with trapezoidal edges 175, 180 in order to maximize the surface area between said stator cores and rotor poles air gap 160. More surface area on both sides of said air gap 160 results in an electric machine with greater active flux density and higher efficiency and greater torque for turning shaft 170.

As is known to those skilled in the art, any electric machine can operate in a reciprocal manner and function as a motor or generator. The machines of the present invention are no exception, and will generate currents by substituting the machine controller, FIG. 6 with generator controller as shown in FIG. 6A. Field excitation power input to the controller comes from an external source such as a battery or rectified AC supply. Excitation input power connects through a power distribution circuit where the input power and generator excitation power are switched in and out of the circuit while supplying power to the microcontroller, drivers and coils. The micro controller program controls coil drive phases that allow the generator to produce power. Induced power from the coils is sent to a generator conditioner circuit where the generated power is distributed between generator power output and a self-excitation drive circuit. The self-excitation power is routed to the power distribution circuit where shaft speed is also monitored. When the shaft speed falls below a pre-set threshold as detected by the shaft speed sensor, the excitation power is switched to stand-by mode; when there is no shaft rotation, the generator excitation power drops to zero, and the power distribution circuit switches back to excitation main power in standby mode.

The micro controller monitors shaft speed and switches back to excite power until the shaft reaches a high enough rate to generate sufficient output current to make the machine self-exciting.

While presently preferred embodiments of the invention have been shown and described, it may otherwise be embodied within the scope of the claims.

We claim:

1. A dipolar axial flux multi-phase electrical machine comprising
   a. at least one rotor assembly having at least N rotor members spaced on a surface of said rotor assembly, where N is a positive integer, and each rotor member comprising a ferrous based face;
   b. stator assembly juxtaposed and spaced apart from said rotor assembly, said stator assembly including X stator members, where X is a positive integer and X>N, said stator members being spaced apart and in parallel axial relationship to said rotor members, each said stator member having a coil axis position which is parallel to the axis of rotation of said rotor assembly, and each stator member having an independent coil whereby each stator member is independently removable and replaceable and wherein one or more phases of the electrical machine can continue to operate when stator members in one or more of the other phases are removed or not operational;
   c. detecting means for detecting the position of said rotor assembly in relationship to stator members; and
   d. a control means for receiving at least a first input from said rotational detecting means for controlling input into selected stator members in response to said detecting means and including means for providing current to at least one stator coil in response to said detecting means.

2. An electrical machine set forth in claim 1 wherein at least one of said stator assembly or rotor assembly is linear.

3. An electrical machine set forth in claim 1 wherein said stator assembly is cylindrical.

4. An electrical machine set forth in claim 1 wherein said rotor assembly is cylindrical.

5. An electrical machine set forth in claim 1 wherein said rotor assembly and stator assembly are concentrically mounted with each other.

6. An electrical machine set forth in claim 1 wherein said rotor assembly is cylindrical and is positioned within and spaced apart from said stator assembly.

7. An electrical machine as set forth in claim 1 wherein said rotor assembly is linear and is positioned under and spaced apart from said stator assembly.

8. An electrical machine as set forth in claim 1 wherein said control means functions in a reciprocal manner to generate electrical power by means of the application of mechanical torque at a given speed to a shaft or carriage of the machine.

9. An electrical machine as set forth in claim 1 wherein the control means includes a secondary coil-drive circuit which obtains its drive energy from the collapsing magnetic field of the primary drive circuit.

10. An electrical machine set forth in claim 1 where there are two separate rotor assemblies set in opposition to each other.

11. An electrical machine as set forth in claim 1 wherein the rotor poles and the stator coils have trapezoidal edges between said rotor poles and the air gap of said stator coils.

* * * * *